United States Patent
Wang et al.

(10) Patent No.: US 12,550,440 B2
(45) Date of Patent: Feb. 10, 2026

(54) DISPLAY SUBSTRATE, MANUFACTURING METHOD THEREOF AND DISPLAY DEVICE

(71) Applicants: Beijing BOE Display Technology Co., Ltd., Beijing (CN); BOE Technology Group Co., Ltd., Beijing (CN)

(72) Inventors: Min Wang, Beijing (CN); Zhe Wang, Beijing (CN); Gang Hua, Beijing (CN); Liguang Deng, Beijing (CN); Dong Wang, Beijing (CN); Shaobo Li, Beijing (CN); Jintang Hu, Beijing (CN); Jinghao Liu, Beijing (CN); Shaokai Su, Beijing (CN); Liangliang Pan, Beijing (CN); Jiahao Bai, Beijing (CN); Zhining Lin, Beijing (CN); Xinyu Chen, Beijing (CN); Zixi Qi, Beijing (CN); Pengqu Zhang, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/015,511

(22) PCT Filed: Feb. 24, 2022

(86) PCT No.: PCT/CN2022/077762
§ 371 (c)(1),
(2) Date: Jan. 10, 2023

(87) PCT Pub. No.: WO2023/159441
PCT Pub. Date: Aug. 31, 2023

(65) Prior Publication Data
US 2024/0274609 A1   Aug. 15, 2024

(51) Int. Cl.
*G02F 1/1676* (2019.01)
*G02F 1/1343* (2006.01)
(Continued)

(52) U.S. Cl.
CPC ......... *H10D 86/60* (2025.01); *G02F 1/13439* (2013.01); *G02F 1/136213* (2013.01);
(Continued)

(58) Field of Classification Search
CPC ............ G02F 1/1347; G02F 1/136286; G02F 1/1336; G02F 1/1343; G02F 1/13452;
(Continued)

(56) References Cited

U.S. PATENT DOCUMENTS

| | | |
|---|---|---|
| 2019/0072830 A1 | 3/2019 | Chen |
| 2020/0152140 A1 | 5/2020 | Ho et al. |
| 2022/0252955 A1 | 8/2022 | Hua et al. |

FOREIGN PATENT DOCUMENTS

| | | |
|---|---|---|
| CN | 104600078 A | 5/2015 |
| CN | 104932163 A | 9/2015 |

(Continued)

*Primary Examiner* — Brandi N Thomas
(74) *Attorney, Agent, or Firm* — IPro, PLLC

(57) ABSTRACT

A display substrate includes a base substrate, the base substrate including a display region, and the display region including a plurality of pixel regions; and at least four conductive layers arranged in a stacked manner, located on the base substrate, wherein any two adjacent conductive layers are arranged in an insulated manner, each of the conductive layers includes conductive patterns located in the pixel regions, the conductive patterns of any two adjacent conductive layers in the same pixel region form a storage capacitor (e.g., $Cst_1$, $Cst_2$ and $Cst_3$), and in a direction perpendicular to the base substrate, projections of the at least
(Continued)

four conductive layers on the base substrate overlap. A manufacturing method of a display substrate and a display device are further provided.

18 Claims, 11 Drawing Sheets

(51) Int. Cl.
　　*G02F 1/1362*　　(2006.01)
　　*G02F 1/1368*　　(2006.01)
　　*G02F 1/167*　　(2019.01)
　　*G02F 1/16756*　　(2019.01)
　　*H10D 86/01*　　(2025.01)
　　*H10D 86/40*　　(2025.01)
　　*H10D 86/60*　　(2025.01)

(52) U.S. Cl.
　　CPC ............ *G02F 1/1368* (2013.01); *G02F 1/167* (2013.01); *G02F 1/16756* (2019.01); *G02F 1/1676* (2019.01); *H10D 86/021* (2025.01); *H10D 86/441* (2025.01)

(58) Field of Classification Search
　　CPC ......... G02F 1/133354; G02F 1/133305; G02F 1/1396; G09G 2300/023; G09G 2320/0646; G09G 2320/0686; G09G 3/342; G09G 3/3426; G09G 3/36; G02B 6/0073; G02B 2027/0196; B32B 2255/20
　　See application file for complete search history.

(56) References Cited

FOREIGN PATENT DOCUMENTS

| | | | |
|---|---|---|---|
| CN | 106527005 A | 3/2017 | |
| CN | 107316873 | * 11/2017 | ............ H10D 86/60 |
| CN | 107316873 A | 11/2017 | |
| CN | 112951854 A | 6/2021 | |
| CN | 214751248 U | 11/2021 | |
| CN | 215006189 U | 12/2021 | |
| JP | 2021117353 | * 8/2021 | ....... G02F 1/133638 |
| KR | 20070049744 A | 5/2007 | |
| TW | I733246 B | 7/2021 | |

* cited by examiner

105

— 1051

DISPLAY SUBSTRATE, MANUFACTURING METHOD THEREOF AND DISPLAY DEVICE

CROSS-REFERENCE TO RELATED APPLICATIONS

This application is a National Stage of International Application No. PCT/CN2022/077762, filed Feb. 24, 2022, which is hereby incorporated by reference in its entirety.

FIELD

The present disclosure relates to the technical field of display, in particular to a display substrate, a manufacturing method thereof and a display device.

BACKGROUND

In recent years, as a reader, a reflective display represented by electrophoresis displaying is greatly applied to the education market with its advantages of eye protection, low power consumption, readability under sunlight, good flexibility and the like.

SUMMARY

According to a display substrate, a manufacturing method thereof and a display device provided by the present disclosure, a specific solution is as follows.

In one aspect, an embodiment of the present disclosure provides a display substrate, including: a base substrate, including a display region, the display region including a plurality of pixel regions; and at least four conductive layers arranged in a stacked manner, located on the base substrate, wherein any two adjacent conductive layers are arranged in an insulated manner, each of the conductive layers includes conductive patterns located in the pixel regions, the conductive patterns of any two adjacent conductive layers in the same pixel region form a storage capacitor, and in a direction perpendicular to the base substrate, projections of the at least four conductive layers on the base substrate overlap.

In some embodiments, in the display substrate, the at least four conductive layers include a first conductive layer, a second conductive layer, a third conductive layer and a pixel electrode layer, wherein the first conductive layer includes a first conductive pattern, the second conductive layer includes a second conductive pattern, the third conductive layer includes a third conductive pattern, and the pixel electrode layer includes pixel electrodes; and the first conductive pattern and the second conductive pattern form a first storage capacitor, the second conductive pattern and the third conductive pattern form a second storage capacitor, the third conductive pattern and the pixel electrodes form a third storage capacitor, the first conductive pattern is electrically connected with the third conductive pattern, and the second conductive pattern is electrically connected with the pixel electrodes.

In some embodiments, the display substrate further includes a first insulating layer, a second insulating layer and a third insulating layer, wherein the first insulating layer is located between the first conductive layer and the second conductive layer, the second insulating layer is located between the second conductive layer and the third conductive layer, and the third insulating layer is located between the third conductive layer and the pixel electrode layer.

In some embodiments, in the display substrate, the second insulating layer and the third insulating layer include through holes arranged in a penetrating manner, and the pixel electrodes are electrically connected with the second conductive pattern via the through holes.

In some embodiments, in the display substrate, the third conductive pattern includes hollowed-out structures, and an orthographic projection of the hollowed-out structures on the base substrate covers an orthographic projection of the through holes on the base substrate.

In some embodiments, in the display substrate, the base substrate further includes a non-display region surrounding the display region; the first conductive layer further includes a first connection line, the first connection line extends in a first direction, and the first connection line and the first conductive pattern are integrally arranged; the third conductive layer further includes a second connection line, the second connection line extends in a second direction, the second connection line and the third conductive pattern are integrally arranged, and the second direction and the first direction are arranged in a crossing manner; and the pixel electrode layer further includes a wire located in the non-display region, and the wire surrounds the display region and is electrically connected with the first connection line and the second connection line.

In some embodiments, the display substrate further includes transistors located in the pixel regions, gates of the transistors are located on the first conductive layer, and first electrodes and second electrodes of the transistors are located on the second conductive layer.

In some embodiments, in the display substrate, the third conductive layer is metal, and an orthographic projection of the third conductive pattern on the base substrate at least covers an orthographic projection of channel regions of the transistors on the base substrate.

In some embodiments, in the display substrate, an orthographic projection of the first conductive pattern on the base substrate surrounds half of an orthographic projection of the transistors on the base substrate.

In some embodiments, in the display substrate an orthographic projection of the second conductive pattern on the base substrate overlaps the orthographic projection of the first conductive pattern on the base substrate, and the second conductive pattern and the first electrodes of the transistors are integrally arranged.

In some embodiments, in the display substrate, an orthographic projection of the pixel electrodes on the base substrate completely covers the orthographic projection of the transistors on the base substrate.

In another aspect, an embodiment of the present disclosure provides a display device, including a display substrate and an opposite substrate disposed opposite to each other and a dimming layer located between the display substrate and the opposite substrate, wherein the display substrate is the above display substrate provided by the embodiment of the present disclosure.

In some embodiments, in the display device, the opposite substrate includes a common electrode, and the common electrode, a first conductive pattern and a third conductive pattern load the same electric signal.

In some embodiments, in the display device, the dimming layer is an electrophoresis layer or a liquid crystal layer.

In another aspect, an embodiment of the present disclosure provides a manufacturing method of a display substrate, including: providing a base substrate, the base substrate including a display region, and the display region including a plurality of pixel regions; and forming at least four conductive layers arranged in a stacked manner on the base substrate, wherein any two adjacent conductive layers are arranged in an insulated manner, each of the conductive layers includes conductive patterns located in the pixel regions, the conductive patterns of any two adjacent conductive layers in the same pixel region form a storage capacitor, and in a direction perpendicular to the base substrate, projections of the at least four conductive layers on the base substrate overlap.

In some embodiments, in the manufacturing method, the forming the at least four conductive layers arranged in the stacked manner on the base substrate, wherein any two adjacent conductive layers are arranged in the insulated manner, each of the conductive layers includes the conductive patterns located in the pixel regions, the conductive patterns of any two adjacent conductive layers in the same pixel region form the storage capacitor, and in the direction perpendicular to the base substrate, the projections of the at least four conductive layers on the base substrate overlap, specifically includes: forming a first conductive layer on the base substrate, the first conductive layer including a first conductive pattern located in the pixel regions; forming a first inorganic insulating layer on the first conductive layer; forming a second conductive layer on the first inorganic insulating layer, the second conductive layer including a second conductive pattern located in the pixel regions, and the second conductive pattern and the first conductive pattern forming a first storage capacitor; forming a second inorganic insulating layer on the second conductive layer; forming a third conductive layer on the second inorganic insulating layer, the third conductive layer including a third conductive pattern located in the pixel regions, and the third conductive pattern and the second conductive pattern forming a second storage capacitor; forming a third inorganic insulating layer on the third conductive layer, and forming first through holes penetrating through the third inorganic insulating layer and the second inorganic insulating layer in the pixel regions through a one-time masking process; and forming a pixel electrode layer on the third inorganic insulating layer, the pixel electrode layer including pixel electrodes located in the pixel regions, the pixel electrodes and the third conductive pattern forming a third storage capacitor, and the pixel electrodes being electrically connected with the second conductive pattern through the first through holes.

In some embodiments, in the manufacturing method, after the second conductive layer is formed on the first inorganic insulating layer and before the second inorganic insulating layer is formed on the second conductive layer, the manufacturing method further includes: forming an organic insulating layer on the second conductive layer, the organic insulating layer including second through holes located in the pixel regions, and the second through holes and the first through holes being arranged in a communication manner.

In some provided by the embodiment of the present disclosure, while the first conductive pattern located in the pixel regions is formed on the base substrate, the manufacturing method further includes: forming a first connection line extending in a first direction and arranged integrally with the first conductive pattern on the first conductive layer; forming the first inorganic insulating layer on the first conductive layer specifically includes: forming third through holes penetrating through the first inorganic insulating layer in a non-display region; while the second conductive pattern located in the pixel regions is formed on the first inorganic insulating layer, the manufacturing method further includes: forming a second connection line extending in a second direction and arranged integrally with the second conductive pattern on the second conductive layer, wherein the second direction and the first direction are arranged in a crossing manner; while the first through holes penetrating through the third inorganic insulating layer and the second inorganic insulating layer are formed in the pixel regions, the manufacturing method further includes: forming fourth through holes penetrating through the third inorganic insulating layer and the second inorganic insulating layer in the non-display region, and forming fifth through holes only penetrating through the third inorganic insulating layer in the non-display region, wherein the fourth through holes and the third through holes communicate with each other; and while the pixel electrodes located in the pixel regions are formed on the third inorganic insulating layer, the manufacturing method further includes: forming a wire located on the pixel electrode layer in the non-display region, the wire being electrically connected with the first connection line through the third through holes and the fourth through holes, and the wire being electrically connected with the second connection line through the fifth through holes.

In some embodiments, in the manufacturing method, after the second conductive layer is formed on the first inorganic insulating layer and before the second inorganic insulating layer is formed on the second conductive layer, the manufacturing method further includes: forming an organic insulating layer on the second conductive layer, the organic insulating layer including second through holes located in the pixel regions and sixth through holes located in the non-display region, the second through holes and the first through holes being arranged in a communication manner, and the sixth through holes enabling the third through holes and the fourth through holes to communicate.

DETAILED DESCRIPTION OF THE EMBODIMENTS

Figure 1:
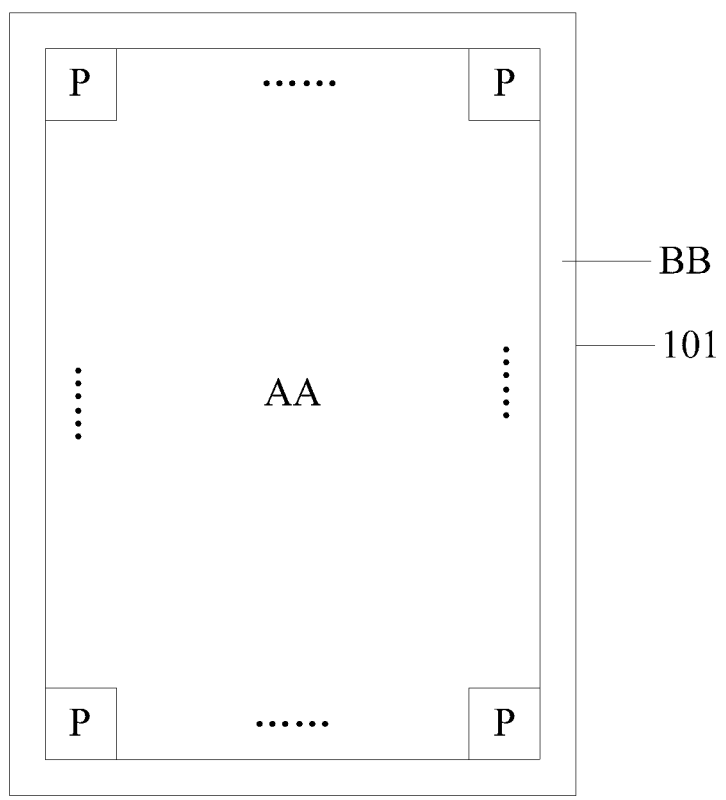
FIG. 1 is a schematic structural diagram of a display substrate provided by an embodiment of the present disclosure.

To make the objectives, technical solutions and advantages of embodiments of the present disclosure clearer, the technical solutions of the embodiments of the present disclosure will be clearly and completely described below in conjunction with the accompanying drawings of the embodiments of the present disclosure. It should be noted that the sizes and shapes of all figures in the accompanying drawings do not reflect true scales, and are only intended to schematically illustrate the content of the present disclosure. The same or similar reference numerals represent the same or similar elements or elements with the same or similar functions all the time.

Unless otherwise defined, technical or scientific terms used herein shall have the ordinary meanings understood by those ordinarily skilled in the art to which the present disclosure pertains. The words "first", "second" and the like used in the specification and claims of the present disclosure do not indicate any order, quantity or importance, but are only used to distinguish different components. The words "comprise" or "include" or the like indicate that an element or item appearing before such words covers listed elements or items appearing after the words and equivalents thereof, and do not exclude other elements or items. "Inner", "outer", "upper", "lower" and the like are only used to represent relative position relationships, and the relative position relationships may also change accordingly after an absolute position of a described object is changed.

With the development of a display technology, there are increasing demands for electronic paper displays (EPD) with high pixels per inch (PPI) in the market. However, with the increase of the pixels per inch, the sizes of pixels are smaller and smaller, the overlapping area of storage capacitors is smaller and smaller, and then the storage capacitors are smaller and smaller. The requirement of an EPD product for a sustaining voltage is still not met by adopting two storage capacitors in the related art.

In order to solve the above technical problems existing in the related art, an embodiment of the present disclosure provides a display substrate, as shown in FIG. 1 to FIG. 8, including:

a first base substrate 101, the first base substrate 101 including a display region AA, and a plurality of pixel regions P being arranged in the display region AA; and at least four conductive layers (e.g., a first conductive layer 102, a second conductive layer 103, a third conductive layer 104 and a pixel electrode layer 105) arranged in a stacked manner, located on the first base substrate 101, wherein any two adjacent conductive layers are arranged in an insulated manner, each of the conductive layers includes conductive patterns (e.g., a first conductive pattern 1021, a second conductive pattern 1031, a third conductive pattern 1041 and a pixel electrode 1051) located in the pixel regions P, the conductive patterns of any two adjacent conductive layers in the same pixel region P form a storage capacitor (e.g., a first storage capacitor $Cst_1$, a second storage capacitor $Cst_2$ and a third storage capacitor $Cst_3$), and in a direction Z perpendicular to the base substrate, projections of the at least four conductive layers on the first base substrate 101 overlap.

In the display substrate provided by some embodiments of the present disclosure, the conductive patterns are arranged in the at least four conductive layers, and the conductive patterns of any two adjacent conductive layers mutually overlap to form the storage capacitor, so that each pixel region P has at least three storage capacitors inside, and a capacitance value of each pixel region P may be effectively increased, which is conductive to keeping a voltage stable.

Figure 2:
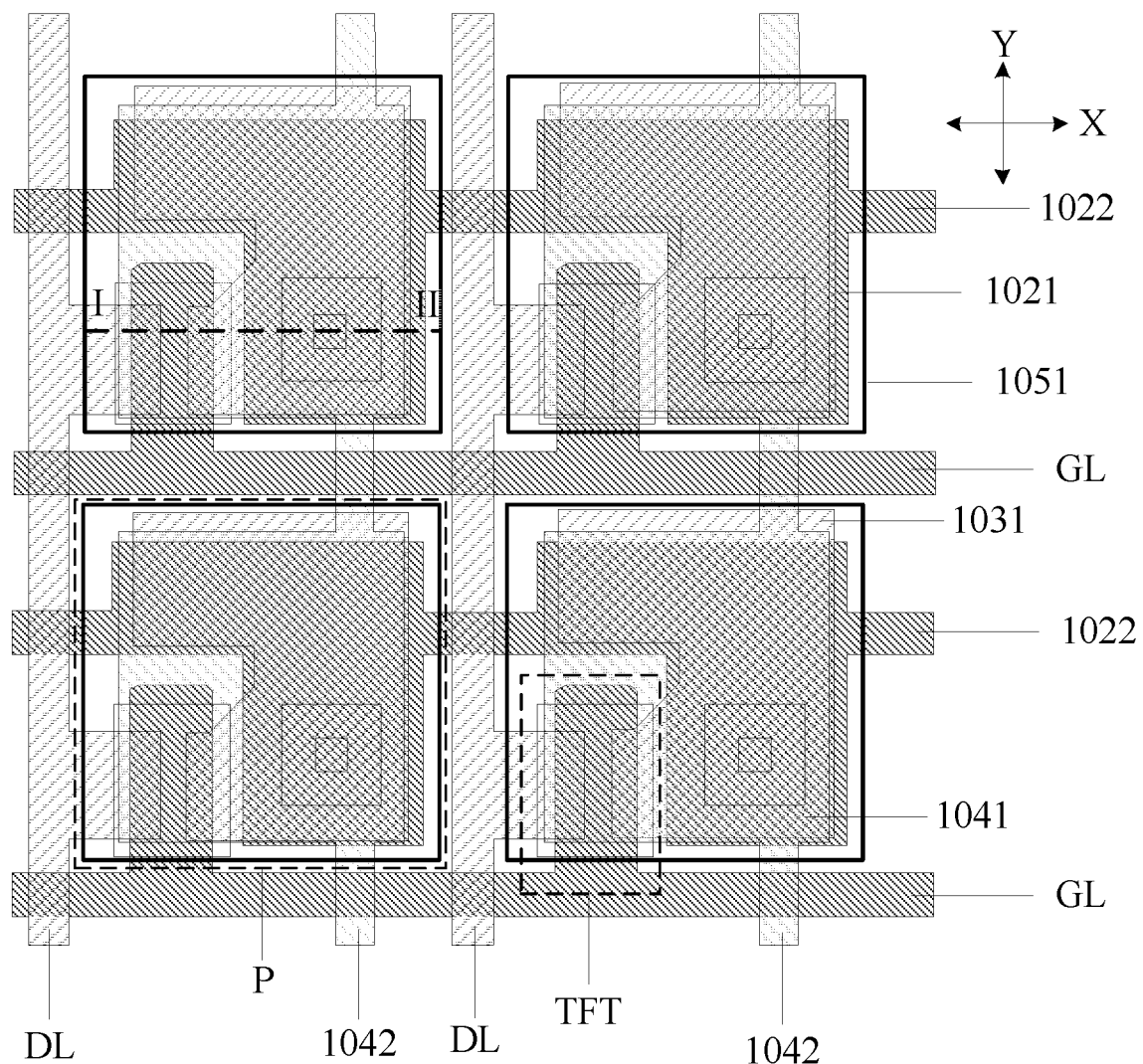
FIG. 2 is a schematic diagram of four pixel regions in FIG. 1.
Figure 3:
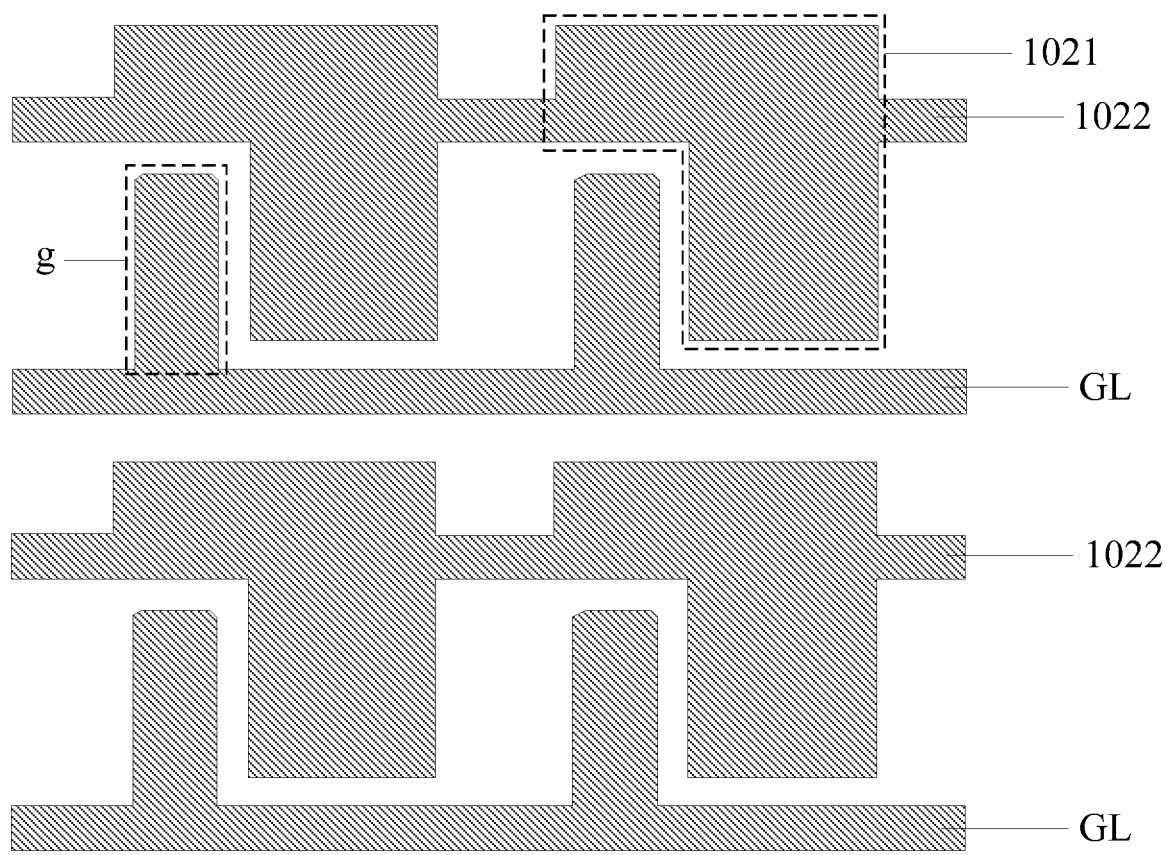
FIG. 3 is a schematic structural diagram of a first conductive layer in FIG. 2.
Figure 4:
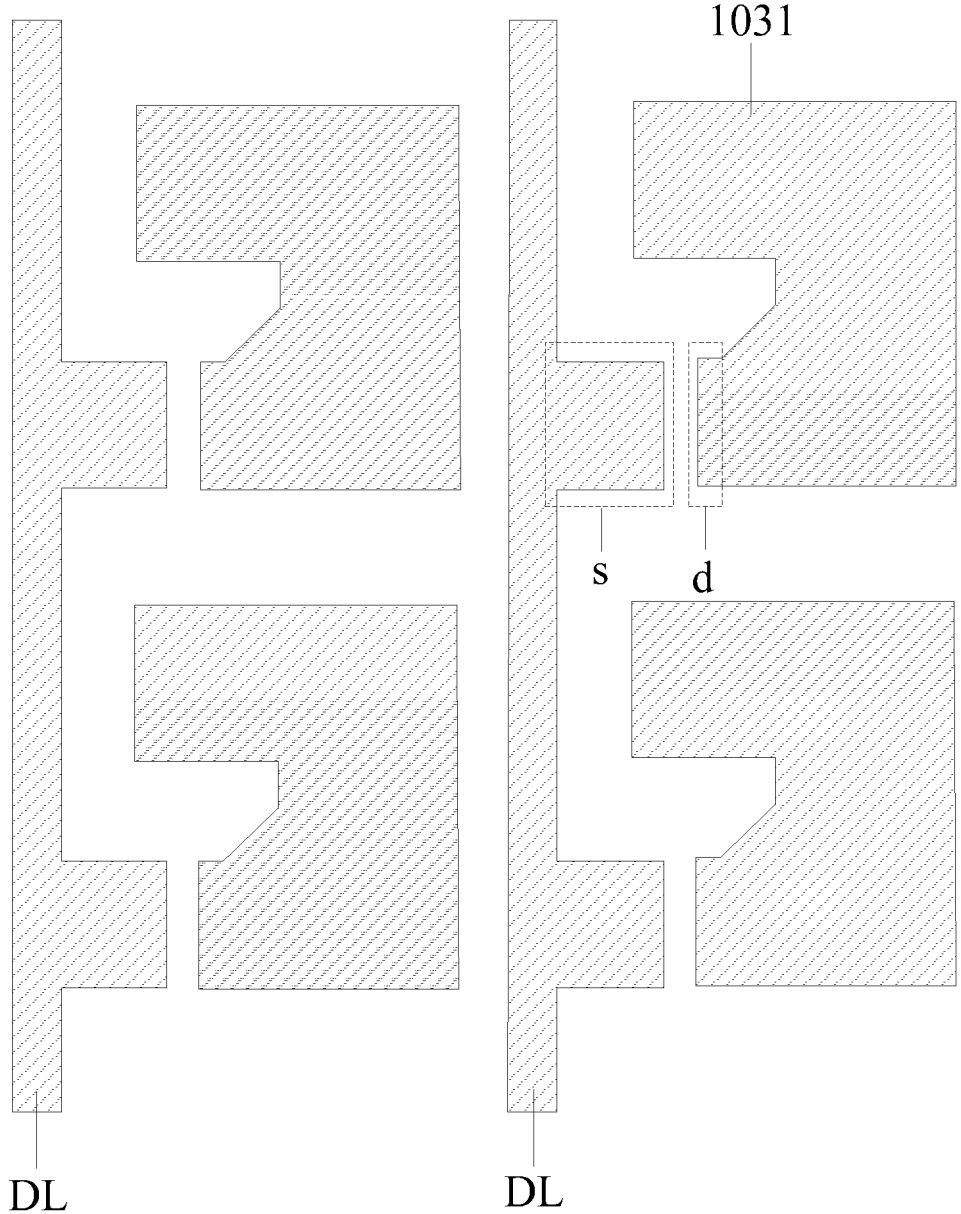
FIG. 4 is a schematic structural diagram of a second conductive layer in FIG. 2.
Figure 5:
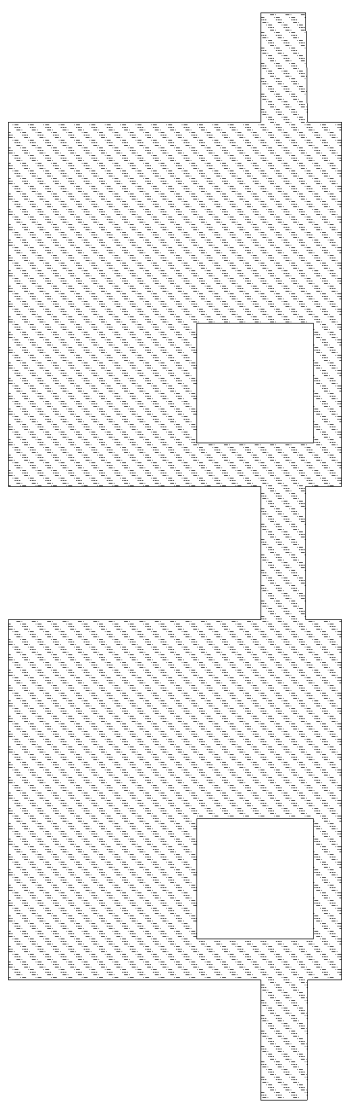
FIG. 5 is a schematic structural diagram of a third conductive layer in FIG. 2.
Figure 5:
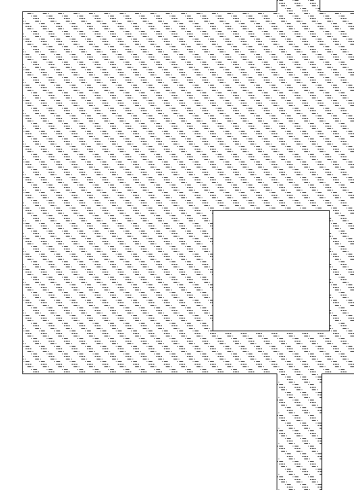
Figure 6:
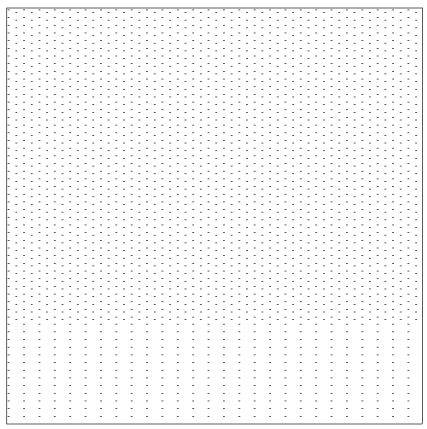
FIG. 6 is a schematic structural diagram of a pixel electrode layer in FIG. 2.
Figure 6:
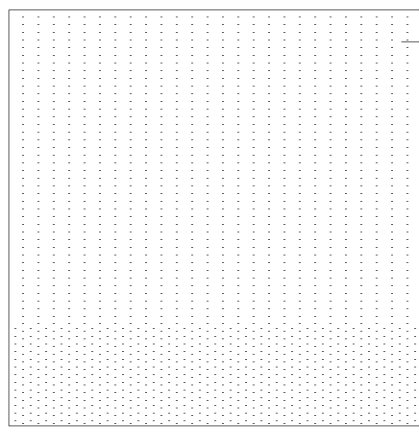
Figure 6:
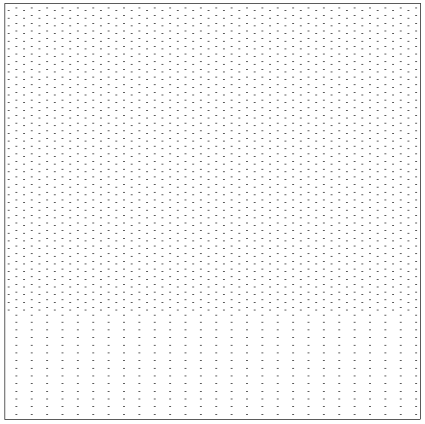
Figure 6:
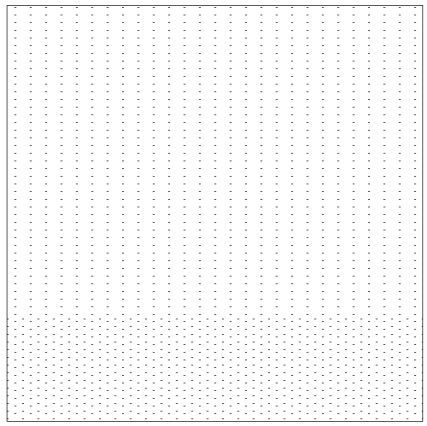
Figure 7:
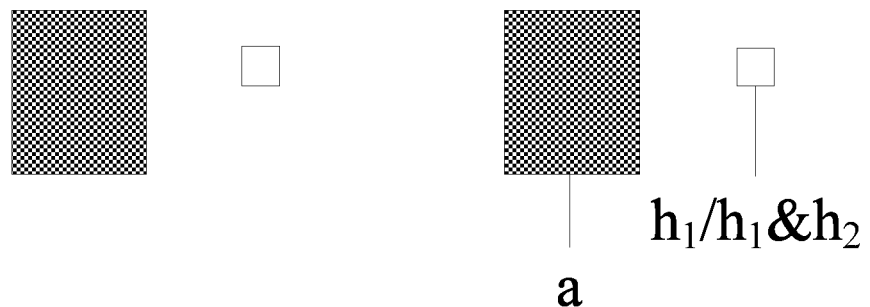
FIG. 7 is a schematic structural diagram of an active layer and an insulating layer in FIG. 2.
Figure 7:

In some embodiments, in the display substrate, as shown in FIG. 2 to FIG. 8, the at least four conductive layers may include the first conductive layer 102, the second conductive layer 103, the third conductive layer 104 and the pixel electrode layer 105, wherein the first conductive layer 102 includes the first conductive pattern 1021, the second conductive layer 103 includes the second conductive pattern 1031, the third conductive layer 104 includes the third conductive pattern 1041, the pixel electrode layer 105 includes the pixel electrode 1051, and a region defined by a thick solid line box in FIG. 2 represents one pixel electrode 1051. The first conductive pattern 1021 and the second conductive pattern 1031 form the first storage capacitor $Cst_1$, the second conductive pattern 1031 and the third conductive pattern 1041 form the second storage capacitor $Cst_2$, the third conductive pattern 1041 and the pixel electrode 1051 form the third storage capacitor $Cst_3$, the first conductive pattern 1021 and the third conductive pattern 1041 are electrically connected, and the second conductive pattern 1031 and the pixel electrode 1051 are electrically connected, so that the first storage capacitor $Cst_1$, the second storage capacitor $Cst_2$ and the third storage capacitor $Cst_3$ are connected in parallel, and the capacitance value in each pixel region P is a sum of a capacitance value of the first storage capacitor $Cst_1$, a capacitance value of the second storage capacitor $Cst_2$ and a capacitance value of the third storage capacitor $Cst_3$, which effectively increases the capacitance value of each pixel region P.

Figure 8:
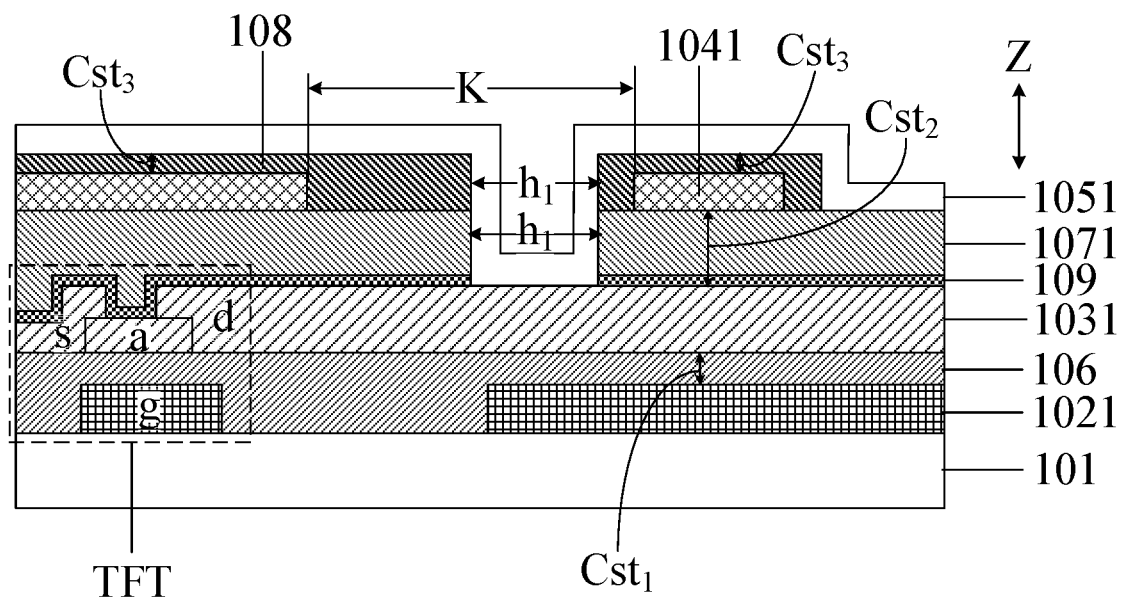
FIG. 8 is a schematic cross-sectional view along a line I-I in FIG. 2.
Figure 9:
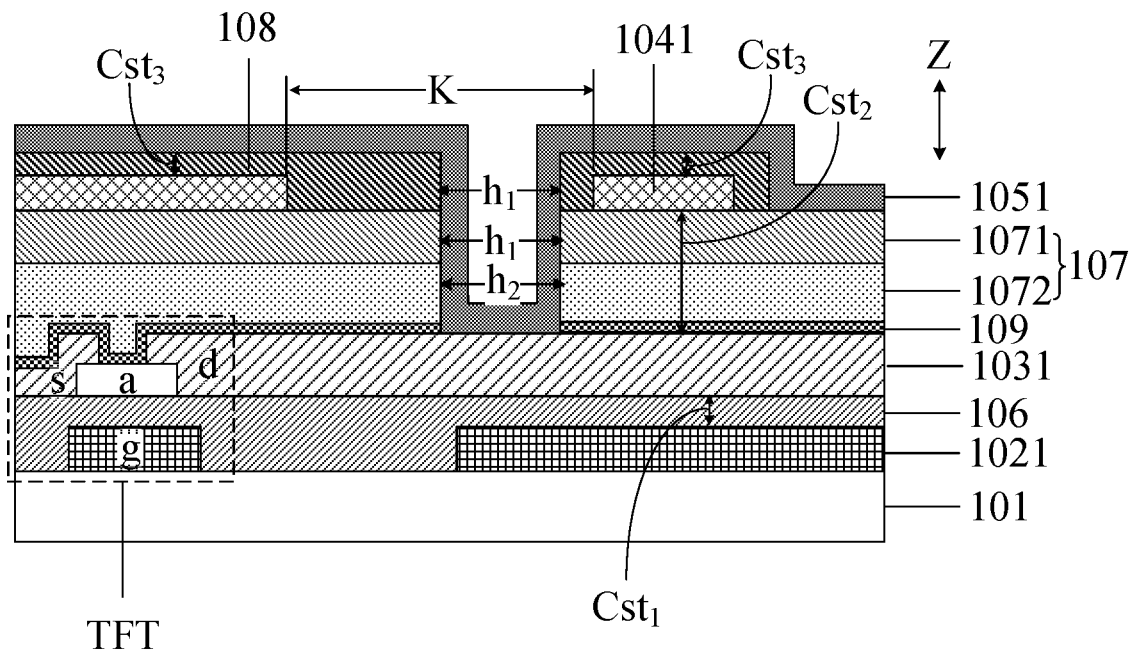
FIG. 9 is another schematic cross-sectional view along the line I-I in FIG. 2.

In some embodiments, as shown in FIG. 8 and FIG. 9, the display substrate may further include a first insulating layer 106, a second insulating layer 107 and a third insulating layer 108, wherein the first insulating layer 106 is located between the first conductive layer 102 and the second conductive layer 103, the second insulating layer 107 is located between the second conductive layer 103 and the third conductive layer 104, and the third insulating layer 108 is located between the third conductive layer 104 and the pixel electrode layer 105, so that it can be guaranteed that the first conductive layer 102 and the second conductive layer 103 are insulated through the first insulating layer 106, the second conductive layer 103 and the third conductive layer 104 are insulated through the second insulating layer 107, and the third conductive layer 104 and the pixel electrode layer 105 are insulated through the third insulating layer 108.

Optionally, the first insulating layer 106 is a first inorganic insulating layer, the second insulating layer 107 is a second inorganic insulating layer 1071, and the third insulating layer 108 is a third inorganic insulating layer; or, the first insulating layer 106 is a first inorganic insulating layer, the third insulating layer 108 is a third inorganic insulating layer, the second insulating layer 107 includes a second inorganic insulating layer 1071 and an organic insulating layer 1072 arranged in a stacked manner, and the second inorganic insulating layer 1071 is located between the organic insulating layer 1072 and the third insulating layer 108. A calculating formula of the capacitance value C is $C=\varepsilon*s/d$, where C represents a dielectric constant of the insulating layers, S represents a facing area of two electrodes in each storage capacitor, and d is a thickness of each insulating layer. It can be seen from the calculating formula of capacitance that the smaller the thickness of each insulating layer, the greater the capacitance value of each storage capacitor, and thus, in the case that the second insulating layer 107 only includes the second inorganic insulating layer 1071, the capacitance value of the second storage capacitor $Cst_2$ is greater than that in the case that the second insulating layer 107 includes the second inorganic insulating layer 1071 and the organic insulating layer 1072.

In some embodiments, in the display substrate as shown in FIG. 8 and FIG. 9, the second insulating layer 107 and the third insulating layer 108 may include through holes arranged in a penetrating manner. For example, in FIG. 8, the through hole is a first through hole $h_1$ penetrating through the second inorganic insulating layer 1071 and the third insulating layer 108. In FIG. 9, the through hole is composed of a first through hole $h_1$ and a second through hole $h_2$ communicating with each other, wherein the first through hole $h_1$ penetrates through the second inorganic insulating layer 1071 and the third insulating layer 108, and the second through hole $h_2$ penetrates through the organic insulating layer 1072. The pixel electrode 1051 is electrically connected with the second conductive pattern 1031 via the through holes (for example, the first through hole $h_1$ in FIG. 8 or the first through hole $h_1$ and the second through hole $h_2$ in FIG. 9). Since materials of the second inorganic insulating layer 1071 and the third insulating layer 108 are both inorganic insulating materials, the first through hole $h_1$ penetrating through the second inorganic insulating layer 1071 and the third insulating layer 108 may be formed through a one-time masking process, and compared with a scheme of manufacturing the through holes through masking on the second inorganic insulating layer 1071 and the third insulating layer 108 respectively, one masking process may be omitted, which is conductive to improving the production efficiency and lowering the manufacturing cost.

In some embodiments, in the display substrate, as shown in FIG. 8 and FIG. 9, in order to electrically connect the pixel electrode 1051 and the second conductive pattern 1031 conveniently, a hollowed-out structure K may be arranged in the third conductive pattern 1041, and an orthographic projection of the hollowed-out structure K on the first base substrate 101 is made to cover an orthographic projection of the through holes (for example, the through hole h1 in FIG. 8, or the first through hole h1 and the second through hole h2 in FIG. 9) on the first base substrate 101.

In some embodiments, in the display substrate, as shown in FIG. 1 to FIG. 3, FIG. 5, FIG. 10 and FIG. 11, the first base substrate 101 may further include a non-display region BB surrounding the display region AA. The first conductive layer 102 may further include a first connection line 1022, the first connection line 1022 extends in a first direction X, and the first connection line 1022 is arranged integrally with the first conductive pattern 1021. The third conductive layer 104 may further include a second connection line 1042, the second connection line 1042 extends in a second direction Y, the second connection line 1042 is arranged integrally with the third conductive pattern 1041, and the second direction Y and the first direction X are arranged in a crossing manner. The pixel electrode layer 105 may further include a wire 1052 located in the non-display region BB, the wire 1052 surrounds the display region AA and is electrically connected with the first connection line 1022 and the second connection line 1042, and therefore, wire jumper connection of the first connection line 1022 and the second connection line 1042 is achieved through the wire 1052 in the pixel electrode layer 105, and then the first conductive pattern 1021 and the third conductive pattern 1041 are electrically connected.

Figure 10:
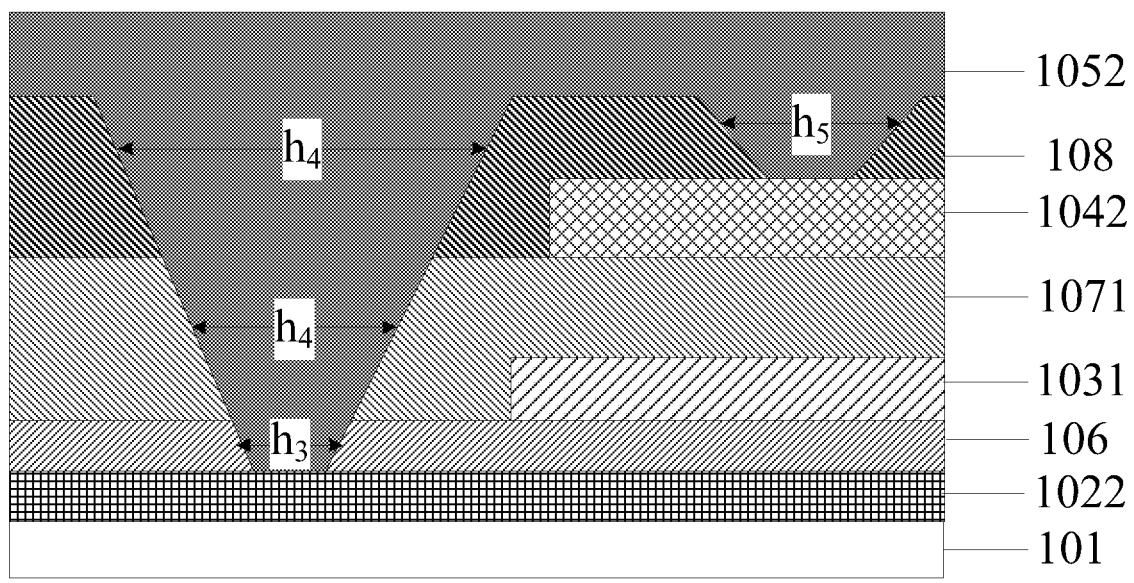
FIG. 10 is a schematic cross-sectional view of a display substrate provided by an embodiment of the present disclosure in a non-display region.

Optionally, as shown in FIG. 10, in the case that the second insulating layer 107 only includes the second inorganic insulating layer 1071, a third through hole $h_3$ penetrating through the first insulating layer 106 may be formed in the non-display region BB first; and then, while the first through hole $h_1$ penetrating through the second inorganic insulating layer 1071 and the third insulating layer 108 is formed in the display region AA, a fourth through hole $h_4$ penetrating through the second inorganic insulating layer 1071 and the third insulating layer 108 and communicating with the third through hole $h_3$ and a fifth through hole $h_5$ only penetrating through the third insulating layer 108 are formed in the non-display region BB, so that the wire 1052 is electrically connected with the first connection line 1022 through the third through hole $h_3$ and the fourth through hole $h_4$ communicating with each other, and the wire 1052 is electrically connected with the second connection line 1042 through the fifth through hole $h_5$.

Figure 11:
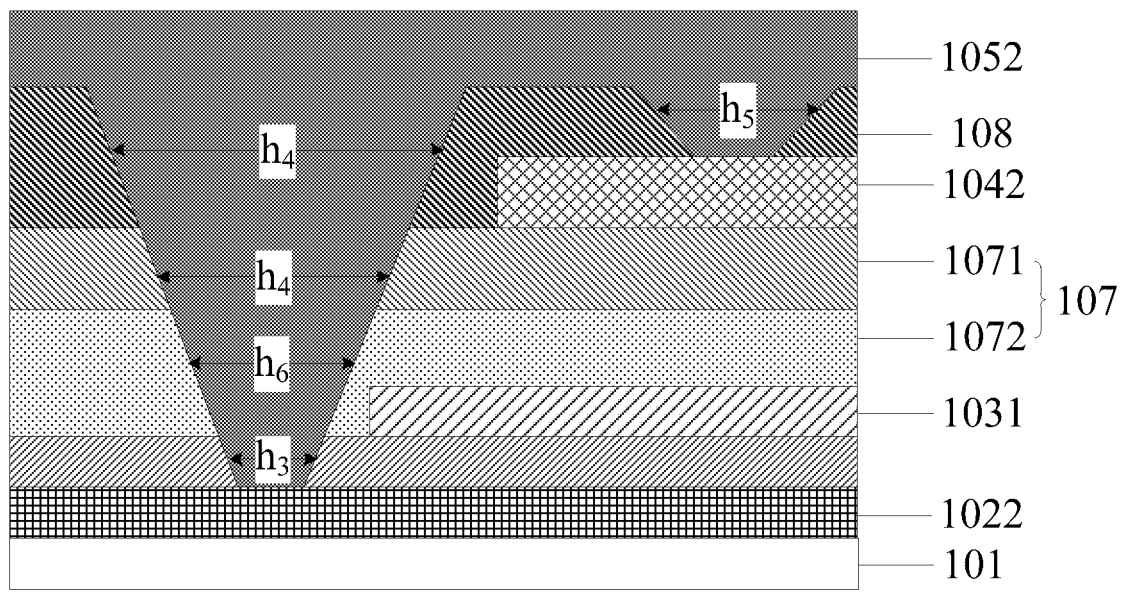
FIG. 11 is another schematic cross-sectional view of a display substrate provided by an embodiment of the present disclosure in a non-display region.

Optionally, as shown in FIG. 11, in the case that the second insulating layer 107 includes the organic insulating layer 1072 and the second inorganic insulating layer 1071 arranged in the stacked manner, the third through hole $h_3$ penetrating through the first insulating layer 106 may be formed in the non-display region BB first; then, a sixth through hole $h_6$ penetrating through the organic insulating layer 1072 and communicating with the third through hole $h_3$ is formed in the non-display region BB; and afterwards, while the first through hole $h_1$ penetrating through the second inorganic insulating layer 1071 and the third insulating layer 108 is formed in the display region AA, the fourth through hole $h_4$ penetrating through the second inorganic insulating layer 1071 and the third insulating layer 108 and communicating with the sixth through hole $h_6$ and the fifth through hole $h_5$ only penetrating through the third insulating layer 108 are formed in the non-display region BB, so that the wire 1052 is electrically connected with the first connection line 1022 through the third through hole $h_3$, the sixth through hole $h_6$ and the fourth through hole $h_4$ communicating with one another, and the wire 1052 is electrically connected with the second connection line 1042 through the fifth through hole $h_5$.

In some embodiments, as shown in FIG. 3, FIG. 4, FIG. 8 and FIG. 9, the display substrate may further include transistors TFT located in the pixel regions P, gates g of the transistors TFT may be located on the first conductive layer 102, and first electrodes d and second electrodes s of the transistors TFT may be located on the second conductive layer 103. The gates g and the first conductive pattern 1021 are prepared through the first conductive layer 102, separately adding a film layer of the first conductive pattern 1021 is avoided, the gates g and the first conductive pattern 1021 may be prepared through a one-time masking process, separately adding a masking process for the first conductive pattern 1021 is avoided, and thus a manufacturing process can be simplified to achieve thinned design. Based on the similar reason, preparing the first electrodes d, the second electrodes s and the second conductive pattern 1031 through the second conductive layer 103 is also conductive to simplifying the manufacturing process to achieve thinned design.

In addition, the transistors TFT mentioned in the embodiment of the present disclosure may be thin film transistors or metal oxide semiconductor field effect transistors, which is not limited here. The transistors TFT may be P-type transistors or N-type transistors. The transistors TFT may be top-gate transistors or bottom-gate transistors. The first electrodes d and the second electrodes s of the transistors TFT are sources and drains respectively, and in practical applications, the first electrodes d and the second electrodes s may interchange in function according to the types of the transistors and different input signals, which is not specifically distinguished.

Optionally, a gate line GL extending in the first direction X may be arranged in the first conductive layer 102, a data line DL extending in the second direction Y may be arranged in the second conductive layer 103, the gate line GL and the data line DL cross to define the pixel regions P, and the conductive patterns (e.g., the first conductive pattern 1021, the second conductive pattern 1031, the third conductive pattern 1041 and the pixel electrode 1051) of the conductive layers may be at least partially located in the pixel regions P. In some embodiments, in order to prevent an electrophoresis layer from being affected by an electric field formed by overlapping of the conductive patterns (e.g., the first conductive pattern 1021, the second conductive pattern 1031, the third conductive pattern 1041 and the pixel electrode 1051) with the gate line GL and/or the data line DL, the conductive patterns (e.g., the first conductive pattern 1021, the second conductive pattern 1031, the third conductive pattern 1041 and the pixel electrode 1051) of the conductive layers are better to be entirely located in the pixel regions P, as shown in FIG. 2.

In some embodiments, in the display substrate, as shown in FIG. 2 to FIG. 9, a material of the third conductive layer 104 may be metal, and an orthographic projection of the third conductive pattern 1041 on the first base substrate 101 may at least cover an orthographic projection of channel regions (i.e., regions of active layers a between the first electrodes d and the second electrodes s) of the transistors TFT on the first base substrate 101. Optionally, the material of the third conductive layer 104 may be a light shielding metal (TPM, Top Metal), and thus in the case that the orthographic projection of the third conductive pattern 1041 on the first base substrate 101 at least covers the orthographic projection of the channel regions (i.e., the regions of the active layers a between the first electrodes d and the second electrodes s) of the transistors TFT on the first base substrate 101, light rays may be effectively blocked, production of a leak current caused by irradiation of the light rays to the channel regions of the transistors TFT is avoided, and thus the stability of the transistors TFT is guaranteed.

In some embodiments, in the display substrate, as shown in FIG. 2 to FIG. 9, an orthographic projection of the first conductive pattern 1021 on the first base substrate 101 surrounds half of an orthographic projection of the transistors TFT on the first base substrate 101, in this way, on the one hand, it can be guaranteed that the first conductive pattern 1021 has a larger area, and thus the capacitance value of the first storage capacitor $Cst_1$ formed by the first conductive pattern 1021 and the second conductive pattern 1031 is larger; and on the other hand, the situation that a signal on the first conductive pattern 1021 and a signal on the transistors TFT interfere with each other since a coupling capacitor is formed by mutual overlapping of the first conductive pattern 1021 and the transistors TFT is avoided.

In some embodiments, in the display substrate, as shown in FIG. 2 to FIG. 9, an orthographic projection of the second conductive pattern 1031 on the first base substrate 101 overlaps the orthographic projection of the first conductive pattern 1021 on the first base substrate 101, and thus the second storage capacitor $Cst_2$ may be formed between the first conductive pattern 1021 and the second conductive pattern 1031. Optionally, in order to make the capacitance value of the second storage capacitor $Cst_2$ be larger, the orthographic projection of the second conductive pattern 1031 on the first base substrate 101 may substantially coincide with the orthographic projection of the first conductive pattern 1021 on the first base substrate 101, that is, the two just coincide with each other or are within an error range caused by the factors such as manufacturing and measurement. In some embodiments, the second conductive pattern 1031 may be arranged integrally with the first electrodes d of the transistors, so that a signal of the transistors TFT is transmitted to the pixel electrode 1051 via the second conductive pattern 1031.

In some embodiments, in the display substrate, as shown in FIG. 2 to FIG. 9, an orthographic projection of the pixel electrode 1051 on the first base substrate 101 may completely cover the orthographic projection of the transistors TFT on the first base substrate 101, so that the pixel electrode 1051 and the third conductive pattern 1041 have a large enough facing area, and the third storage capacitor $Cst_3$ with a larger capacitance value is formed; and at the same time, the larger-area pixel electrode 1051 may further better control the electrophoresis layer to improve the display quality.

In some embodiments, as shown in FIG. 8 and FIG. 9, the display substrate may further include a buffer layer 109. Other essential components of the display substrate shall be understood by those of ordinary skill in the art, and are omitted herein and also shall not become a restriction to the present disclosure.

Figure 12:
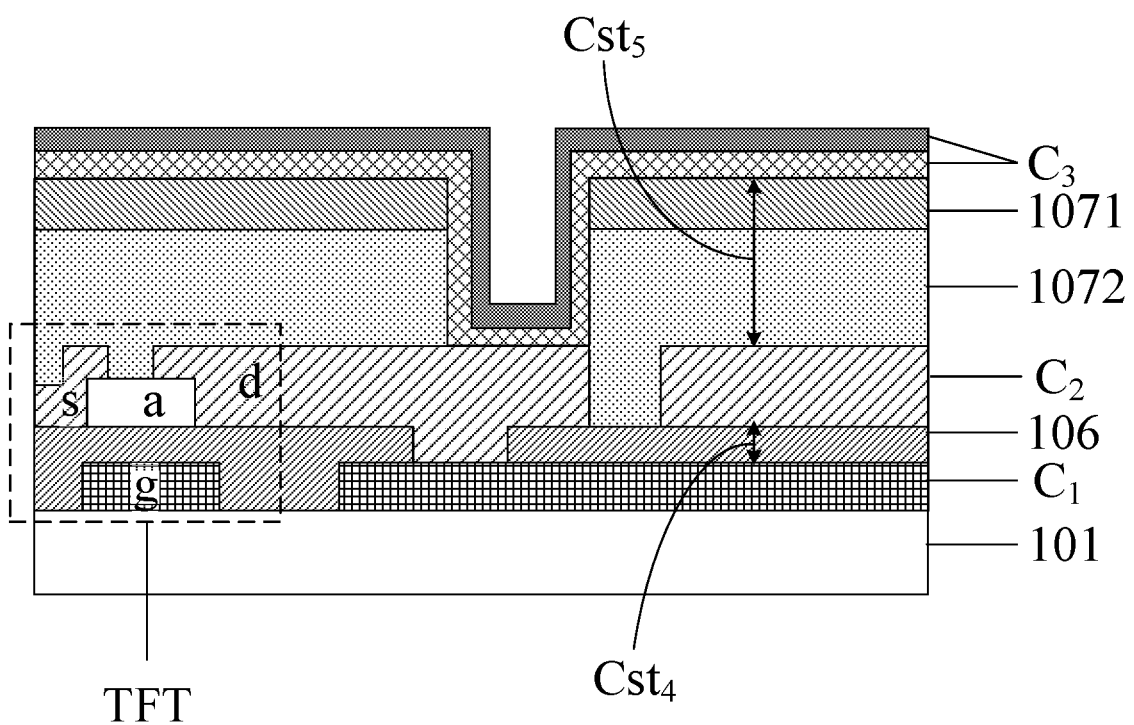
FIG. 12 is a schematic cross-sectional view of a display substrate in the related art.

As shown in FIG. 12, in the related art, a storage capacitor in each pixel region P is composed of a fourth storage capacitor $Cst_4$ and a fifth storage capacitor $Cst_5$, wherein the fourth storage capacitor $Cst_4$ is composed of a fourth conductive pattern $C_1$ arranged on the same layer as the gates g of the transistors TFT and a fifth conductive pattern $C_2$ arranged on the same layer as the first electrodes d and the second electrodes s of the transistors TFT, and the first insulating layer 106 is located between the fourth conductive pattern $C_1$ and the fifth conductive pattern $C_2$; and the fifth storage capacitor $Cst_5$ is composed of the fifth conductive pattern $C_2$ arranged on the same layer as the first electrodes d and the second electrodes s of the transistors TFT and a sixth conductive pattern $C_3$ located on the third conductive layer 104 and the pixel electrode layer 105, and the second inorganic insulating layer 1071 and the organic insulating layer 1072 are located between the fifth conductive pattern $C_2$ and the sixth conductive pattern $C_3$.

In addition, taking an example that the pitch of each pixel region P is 60 m, the present disclosure further provides related data of the storage capacitor of the display substrate shown in FIG. 9 and the storage capacitor in the related art shown in FIG. 12. Specifically, Table 1 shows parameters of the insulating layers, in which GI represents the first insulating layer 106, PVX1 represents the second inorganic insulating layer 1071, PVX2 represents the third insulating layer 108, and Resin represents the organic insulating layer 1072. Table 2 shows comparison data of the storage capacitors, and it can be seen from Table 2 that a total capacitance value of one pixel region P in the present disclosure is 0.7186 pF, which is within a range of 0.6 pF to 1 pF required by a sustaining voltage. Compared with the total capacitance value 0.1746 pF in the related art, it is increased by 311.6%, and thus the structure shown in FIG. 9 of the present disclosure can effectively meet the requirement of the sustaining voltage.

TABLE 1

| Film layer | Material | Thickness (Å) | Dielectric constant $\in$ | Capacitance Ci per unit area (F/$\mu m^2$) |
|---|---|---|---|---|
| GI | Silicon nitride (SINx) | 4000 | 7.3 | 1.62E−16 |
| PVX1 | Silicon nitride (SiNx) | 2000 | 6.5 | 2.88E−16 |
| PVX2 | Silicon nitride (SINx) | 2000 | 6.5 | 2.88E−16 |
| Resin | Acryl | 15000 | 3 | 1.77E−17 |

TABLE 2

| Category | The present disclosure | | | Related art | |
|---|---|---|---|---|---|
| Storage capacitor | $Cst_1$ | $Cst_2$ | $Cst_3$ | $Cst_4$ | $Cst_5$ |
| Insulating layer | GI | PVX1 + Resin | PVX2 | GI | PVX1 + Resin |
| Ci (F/$\mu m^2$) | 1.62E−16 | 1.67E−17 | 2.88E−16 | 1.62E−16 | 1.67E−17 |
| Facing area Area ($\mu m^2$) | 1497 | 1168 | 1589 | 977 | 1003 |
| Capacitance value Cap. (pF) | 0.2419 | 0.0195 | 0.4572 | 0.1579 | 0.0167 |
| Total capacitance value Cap. (pF) | 0.7186 | | | 0.1746 | |
| Change | | 311.6% | | | |

Based on the same inventive concept, an embodiment of the present disclosure provides a manufacturing method of the above display substrate. Since the principle of solving the problem of the manufacturing method is similar to that of the display substrate, the implementation of the manufacturing method provided by embodiments of the present disclosure may refer to the implementation of the display substrate provided by the embodiment of the present disclosure, and will not be repeated.

Optionally, the manufacturing method of the display substrate provided by the embodiment of the present disclosure includes the following steps:

a base substrate is provided, the base substrate including a display region, and the display region including a plurality of pixel regions; and at least four conductive layers arranged in a stacked manner are formed on the base substrate, wherein any two adjacent conductive layers are arranged in an insulated manner, each of the conductive layers includes conductive patterns located in the pixel regions, the conductive patterns of any two adjacent conductive layers in the same pixel region form a storage capacitor, and in a direction perpendicular to the base substrate, projections of the at least four conductive layers on the base substrate overlap.

In some embodiments, in the manufacturing method, the step that the at least four conductive layers arranged in the stacked manner are formed on the base substrate, wherein any two adjacent conductive layers are arranged in the insulated manner, each of the conductive layers includes the conductive patterns located in the pixel regions, the conductive patterns of any two adjacent conductive layers in the same pixel region form the storage capacitor, and in the direction perpendicular to the base substrate, the projections of the at least four conductive layers on the base substrate overlap, may be specifically implemented through the following manner:

forming a first conductive layer on the base substrate, the first conductive layer including a first conductive pattern located in the pixel regions;

forming a first inorganic insulating layer on the first conductive layer;

forming a second conductive layer on the first inorganic insulating layer, the second conductive layer including a second conductive pattern located in the pixel regions, and the second conductive pattern and the first conductive pattern forming a first storage capacitor;

forming a second inorganic insulating layer on the second conductive layer;

forming a third conductive layer on the second inorganic insulating layer, the third conductive layer including a third conductive pattern located in the pixel regions, and the third conductive pattern and the second conductive pattern forming a second storage capacitor;

forming a third inorganic insulating layer on the third conductive layer, and forming first through holes penetrating through the third inorganic insulating layer and the second inorganic insulating layer in the pixel regions through a one-time masking process; and forming a pixel electrode layer on the third inorganic insulating layer, the pixel electrode layer including pixel electrodes located in the pixel regions, the pixel electrodes and the third conductive pattern forming a third storage capacitor, and the pixel electrodes being electrically connected with the second conductive pattern through the first through holes.

In some embodiments, in the manufacturing method, after the second conductive layer is formed on the first inorganic insulating layer and before the second inorganic insulating layer is formed on the second conductive layer, the following step may be further executed:

an organic insulating layer is formed on the second conductive layer, the organic insulating layer including second through holes located in the pixel regions, and the second through holes and the first through holes being arranged in a communication manner, so that the pixel electrodes are electrically connected with the second conductive pattern through the first through holes and the second through holes.

It should be noted that, in the present disclosure, the first inorganic insulating layer, the second inorganic insulating layer, the third inorganic insulating layer and the organic insulating layer are all used for insulation, and thus, in some embodiments, the inorganic insulating layers in the present disclosure may be replaced with organic insulating layers, and the organic insulating layer may also be replaced with an inorganic insulating layer, which is not specifically limited here. In order to reduce the frequency of masking, it needs to guarantee that the third inorganic insulating layer and the second inorganic insulating layer are made of the same material, for example, they may be both made of an inorganic insulating material or an organic insulating material.

In some embodiments, in the manufacturing method, while the first conductive pattern located in the pixel regions is formed on the base substrate, a first connection line extending in a first direction and arranged integrally with the first conductive pattern may be further formed on the first conductive layer.

Forming the first inorganic insulating layer on the first conductive layer may be specifically implemented through the following manner: forming third through holes penetrating through the first inorganic insulating layer in a non-display region.

While the second conductive pattern located in the pixel regions is formed on the first inorganic insulating layer, a second connection line extending in a second direction and arranged integrally with the second conductive pattern may be further formed on the second conductive layer, wherein the second direction and the first direction are arranged in a crossing manner.

While the first through holes penetrating through the third inorganic insulating layer and the second inorganic insulating layer are formed in the pixel regions, fourth through holes penetrating through the third inorganic insulating layer and the second inorganic insulating layer and fifth through holes only penetrating through the third inorganic insulating layer may be further formed in the non-display region, wherein the fourth through holes and the third through holes communicate with each other.

While the pixel electrodes located in the pixel regions are formed on the third inorganic insulating layer, a wire located on the pixel electrode layer may be further formed in the non-display region, the wire is electrically connected with the first connection line through the third through holes and the fourth through holes, and the wire is electrically connected with the second connection line through the fifth through holes.

In some embodiments, in the manufacturing method, after the second conductive layer is formed on the first inorganic insulating layer and before the second inorganic insulating layer is formed on the second conductive layer, an organic insulating layer may be further formed on the second conductive layer, the organic insulating layer includes the second through holes located in the pixel regions and sixth through holes located in the non-display region, the second through holes and the first through holes are arranged in a communicating manner, and the sixth through holes enable the third through holes and the fourth through holes to communication, so that the wire is electrically connected with the first connection line through the third through holes, the sixth through holes and the fourth through holes, and the wire is electrically connected with the second connection line through the fifth through holes.

Based on the same inventive concept, an embodiment of the present disclosure provides a display device. Since the principle of solving the problem of the display device is similar to that of the display substrate, the implementation of the display device provided by embodiments of the present disclosure may refer to the implementation of the display substrate provided by embodiments of the present disclosure, and will not be repeated.

Figure 13:
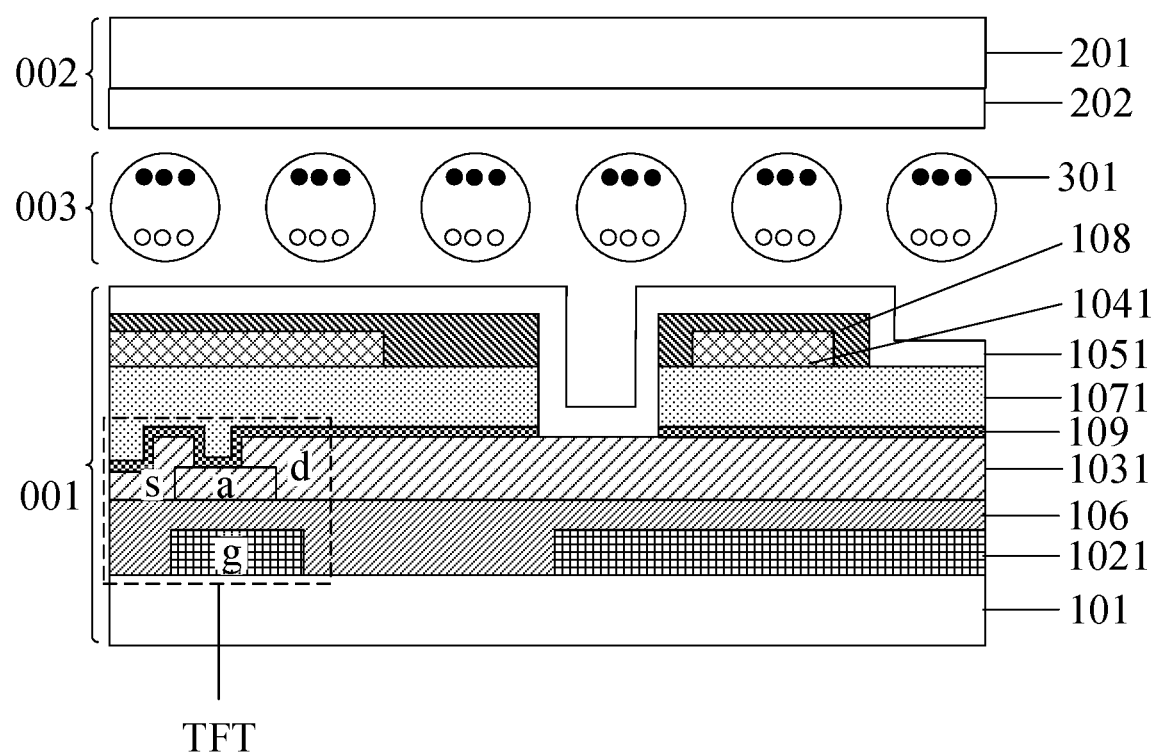
FIG. 13 is a schematic structural diagram of a display device provided by an embodiment of the present disclosure.

Optionally, as shown in FIG. 12 and FIG. 13, the display device provided by the embodiment of the present disclosure includes a display substrate 001 and an opposite substrate 002 disposed opposite to each other and a dimming layer 003 located between the display substrate 001 and the opposite substrate 002, wherein the display substrate 001 is the above display substrate provided by the embodiment of the present disclosure.

In some embodiments, in the display device, the opposite substrate 002 may include a second base substrate 201 and a common electrode 202 located on a side of the second base substrate 201 facing the dimming layer 003. Optionally, the common electrode 202 may be electrically connected with a first conductive pattern 1021 and a third conductive pattern 1041 through conductive silver adhesives, so that the common electrode 202, the first conductive pattern 1021 and the third conductive pattern 1041 load the same common voltage electric signal (Vcom).

Figure 14:
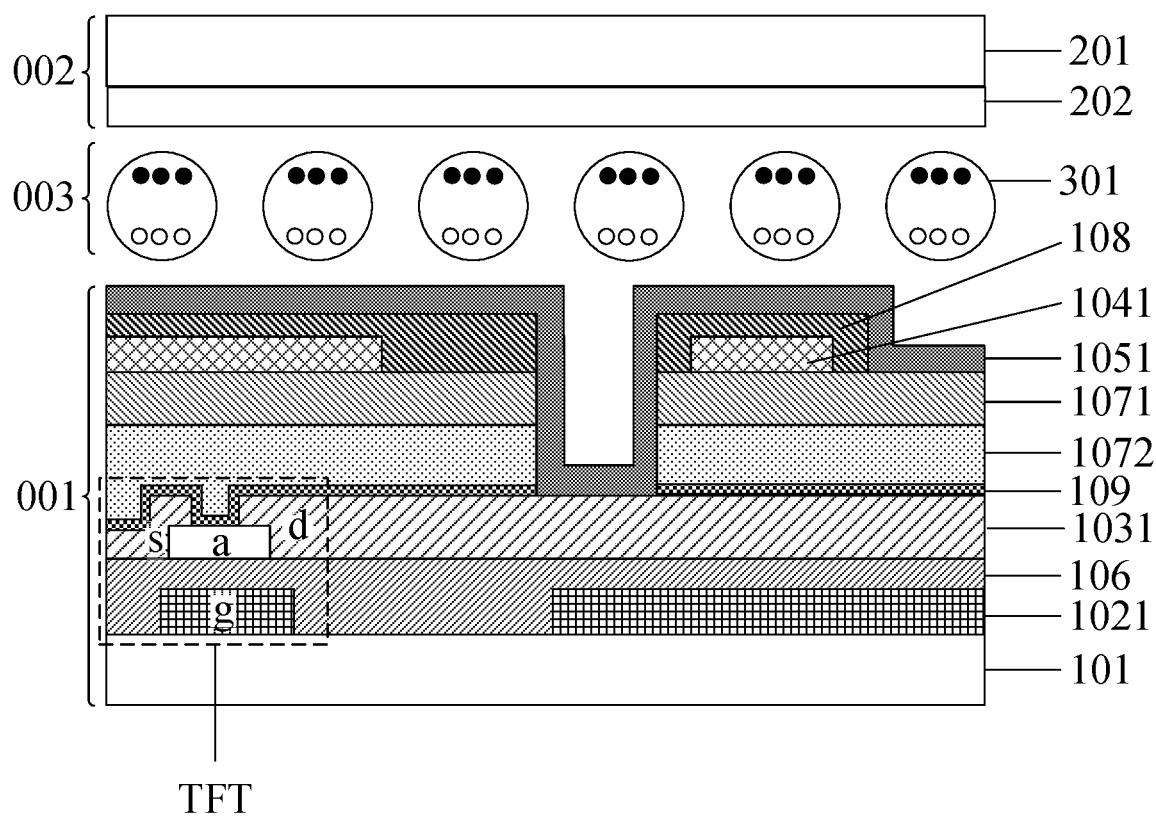
FIG. 14 is another schematic structural diagram of a display device provided by an embodiment of the present disclosure.

In some embodiments, in the display device, the dimming layer 003 may be an electrophoresis layer (e.g., as shown in FIG. 13 and FIG. 14) or a liquid crystal layer. Description is made by taking an example that the dimming layer 003 is the electrophoresis layer in the present disclosure. Optionally, as shown in FIG. 13 and FIG. 14, the electrophoresis layer 003 may include: a plurality of electrophoretic particles 301, each of the electrophoretic particles 301 may include: a particle body as well as an electrophoretic solution and a charge particle locate in the particle body, and the charge particles may include: black particles, white particles, color particles and the like. Driving of the electrophoretic particles includes: a reversing stage, an up-down shaking stage and a write-in stage. The purpose of the reversing stage is to keep charge conservation, the up-down shaking stage is to eliminate the impact of the previous frame of picture on the next frame of picture, and in the write-in stage, according to a picture to be written (e.g., a black picture), if a write-in voltage is 15 V, then a common voltage is generally about 0 V, a turn-on voltage of 20 V is given to a scanning signal on a gate line DL, 15 V is given to a data signal on a data line DL, the voltages are transmitted to a pixel electrode 1051 through transistors TFT, the pixel electrode 1051 and the common electrode 202 form an electric field to drive the black particles to move to the upper position, the electrophoretic particles 301 show uniform and stable black generally through multi-frame driving, between multi-frame driving, a storage capacitor plays a role in sustaining a pixel voltage, in general, the larger the storage capacitor, the better the sustaining, but an excessively large storage capacitor will affect charging of pixels, and thus the storage capacitor in a reader product is generally between 0.1 pF and 1.2 pF. The power is off after writing of several frames, the electrophoretic particles 301 may keep original positions unchanged through floating force and viscous force in the electrophoretic solution, and thus power is saved and eyes are protected through environment-light displaying.

In some embodiments, the display device provided may further include but is not limited to: a radio frequency unit, a network module, an audio output & input unit, a sensor, a user input unit, an interface unit, a memory, a processor, a power supply and other components. In addition, those skilled in the art can understand that the above structure does not constitute a limitation of the display device provided by the embodiment of the present disclosure. In other words, the display device provided by the embodiment of the present disclosure may include more or less components, or combine some components, or different component arrangements.

Apparently, those skilled in the art can make various modifications and variations to the embodiments of the present disclosure without departing from the spirit and scope of the embodiments of the present disclosure. In this way, under the condition that these modifications and variations to the embodiments of the present disclosure fall within the scope of the claims of the present disclosure and their equivalent technologies, the present disclosure is also intended to include these modifications and variations.

What is claimed is:

1. A display substrate, comprising:
a base substrate, comprising a display region, the display region comprising a plurality of pixel regions; and
at least four conductive layers arranged in a stacked manner on the base substrate, wherein any two adjacent conductive layers are arranged in an insulated manner, each of the conductive layers comprises conductive patterns located in the pixel regions, the conductive patterns of any two adjacent conductive layers in a same pixel region form a storage capacitor, and in a direction perpendicular to the base substrate, projections of the at least four conductive layers on the base substrate overlap with each other;
wherein the at least four conductive layers comprise a first conductive layer, a second conductive layer, a third conductive layer and a pixel electrode layer, wherein
the first conductive layer comprises a first conductive pattern, the second conductive layer comprises a second conductive pattern, the third conductive layer comprises a third conductive pattern, and the pixel electrode layer comprises pixel electrodes; and
the first conductive pattern and the second conductive pattern form a first storage capacitor, the second conductive pattern and the third conductive pattern form a second storage capacitor, the third conductive pattern and the pixel electrodes form a third storage capacitor, the first conductive pattern is electrically connected with the third conductive pattern, and the second conductive pattern is electrically connected with the pixel electrodes.

2. The display substrate according to claim 1, further comprising a first insulating layer, a second insulating layer and a third insulating layer, wherein the first insulating layer is between the first conductive layer and the second conductive layer, the second insulating layer is between the second conductive layer and the third conductive layer, and the third insulating layer is between the third conductive layer and the pixel electrode layer.

3. The display substrate according to claim 2, wherein the second insulating layer and the third insulating layer comprise through holes arranged in a penetrating manner, and the pixel electrodes are electrically connected with the second conductive pattern via the through holes.

4. The display substrate according to claim 3, wherein the third conductive pattern comprises hollowed-out structures, and an orthographic projection of the hollowed-out structures on the base substrate covers an orthographic projection of the through holes on the base substrate.

5. The display substrate according to claim 1, wherein the base substrate further comprises a non-display region surrounding the display region;
the first conductive layer further comprises a first connection line, the first connection line extends in a first direction, and the first connection line and the first conductive pattern are integrally arranged;
the third conductive layer further comprises a second connection line, the second connection line extends in a second direction, the second connection line and the third conductive pattern are integrally arranged, and the second direction intersects the first direction; and
the pixel electrode layer further comprises a wire located in the non-display region, and the wire surrounds the display region and is electrically connected with the first connection line and the second connection line.

6. The display substrate according to claim 1, further comprising transistors located in the pixel regions, wherein gates of the transistors are on the first conductive layer, and first electrodes and second electrodes of the transistors are on the second conductive layer.

7. The display substrate according to claim 6, wherein the third conductive layer is metal, and an orthographic projection of the third conductive pattern on the base substrate at least covers an orthographic projection of channel regions of the transistors on the base substrate.

8. The display substrate according to claim 6, wherein an orthographic projection of the first conductive pattern on the base substrate surrounds half of an orthographic projection of the transistors on the base substrate.

9. The display substrate according to claim 6, wherein an orthographic projection of the second conductive pattern on the base substrate overlaps the orthographic projection of the first conductive pattern on the base substrate, and the second conductive pattern and the first electrodes of the transistors are integrally arranged.

10. The display substrate according to claim 6, wherein an orthographic projection of the pixel electrodes on the base substrate covers the orthographic projection of the transistors on the base substrate.

11. A display device, comprising a display substrate and an opposite substrate disposed opposite to each other and a dimming layer located between the display substrate and the opposite substrate;
wherein the display substrate comprises:
a base substrate, comprising a display region, the display region comprising a plurality of pixel regions; and
at least four conductive layers arranged in a stacked manner on the base substrate, wherein any two adjacent conductive layers are arranged in an insulated manner, each of the conductive layers comprises conductive patterns located in the pixel regions, the conductive patterns of any two adjacent conductive layers in a same pixel region form a storage capacitor, and in a direction perpendicular to the base substrate, projections of the at least four conductive layers on the base substrate overlap with each other;
wherein the at least four conductive layers comprise a first conductive layer, a second conductive layer, a third conductive layer and a pixel electrode layer, wherein
the first conductive layer comprises a first conductive pattern, the second conductive layer comprises a second conductive pattern, the third conductive layer comprises a third conductive pattern, and the pixel electrode layer comprises pixel electrodes; and
the first conductive pattern and the second conductive pattern form a first storage capacitor, the second conductive pattern and the third conductive pattern form a second storage capacitor, the third conductive pattern and the pixel electrodes form a third storage capacitor, the first conductive pattern is electrically connected with the third conductive pattern, and the second conductive pattern is electrically connected with the pixel electrodes.

12. The display device according to claim 11, wherein the opposite substrate comprises a common electrode, and the common electrode, a first conductive pattern and a third conductive pattern load a same electric signal.

13. The display device according to claim 11, wherein the dimming layer is an electrophoresis layer or a liquid crystal layer.

14. A method for manufacturing the display substrate according to claim 1, comprising:

providing a base substrate, the base substrate comprising a display region, and the display region comprising a plurality of pixel regions; and forming at least four conductive layers arranged in a stacked manner on the base substrate, wherein any two adjacent conductive layers are arranged in an insulated manner, each of the conductive layers comprises conductive patterns located in the pixel regions, the conductive patterns of any two adjacent conductive layers in a same pixel region form a storage capacitor, and in a direction perpendicular to the base substrate, projections of the at least four conductive layers on the base substrate overlap with each other.

15. The method according to claim 14, wherein the forming the at least four conductive layers arranged in the stacked manner on the base substrate, wherein any two adjacent conductive layers are arranged in the insulated manner, each of the conductive layers comprises the conductive patterns located in the pixel regions, the conductive patterns of any two adjacent conductive layers in the same pixel region form the storage capacitor, and in the direction perpendicular to the base substrate, the projections of the at least four conductive layers on the base substrate overlap with each other, comprises:

forming a first conductive layer on the base substrate, the first conductive layer comprising a first conductive pattern located in the pixel regions;

forming a first inorganic insulating layer on the first conductive layer;

forming a second conductive layer on the first inorganic insulating layer, the second conductive layer comprising a second conductive pattern located in the pixel regions, and the second conductive pattern and the first conductive pattern forming a first storage capacitor;

forming a second inorganic insulating layer on the second conductive layer;

forming a third conductive layer on the second inorganic insulating layer, the third conductive layer comprising a third conductive pattern located in the pixel regions, and the third conductive pattern and the second conductive pattern forming a second storage capacitor;

forming a third inorganic insulating layer on the third conductive layer, and forming first through holes penetrating through the third inorganic insulating layer and the second inorganic insulating layer in the pixel regions through a one-time masking process; and forming a pixel electrode layer on the third inorganic insulating layer, the pixel electrode layer comprising pixel electrodes located in the pixel regions, the pixel electrodes and the third conductive pattern forming a third storage capacitor, and the pixel electrodes being electrically connected with the second conductive pattern through the first through holes.

16. The method according to claim 15, wherein after the second conductive layer is formed on the first inorganic insulating layer and before the second inorganic insulating layer is formed on the second conductive layer, the method further comprises:

forming an organic insulating layer on the second conductive layer, the organic insulating layer comprising second through holes located in the pixel regions, and the second through holes and the first through holes being arranged in a communication manner.

17. The method according to claim 15, wherein the forming the first conductive pattern located in the pixel regions on the base substrate, comprises: forming a first connection line extending in a first direction and arranged integrally with the first conductive pattern on the first conductive layer;

the forming the first inorganic insulating layer on the first conductive layer comprises: forming third through holes penetrating through the first inorganic insulating layer in a non-display region;

the forming the second conductive pattern located in the pixel regions on the first inorganic insulating layer, comprises: forming a second connection line extending in a second direction and arranged integrally with the second conductive pattern on the second conductive layer, wherein the second direction intersects the first direction;

the forming the first through holes penetrating through the third inorganic insulating layer and the second inorganic insulating layer in the pixel regions, comprises: forming fourth through holes penetrating through the third inorganic insulating layer and the second inorganic insulating layer in the non-display region, and forming fifth through holes only penetrating through the third inorganic insulating layer in the non-display region, wherein the fourth through holes and the third through holes communicate with each other; and the forming the pixel electrodes located in the pixel regions on the third inorganic insulating layer, comprises: forming a wire located on the pixel electrode layer in the non-display region, the wire being electrically connected with the first connection line through the third through holes and the fourth through holes, and the wire being electrically connected with the second connection line through the fifth through holes.

18. The method according to claim 17, wherein after the second conductive layer is formed on the first inorganic insulating layer and before the second inorganic insulating layer is formed on the second conductive layer, the manufacturing method further comprises:

forming an organic insulating layer on the second conductive layer, the organic insulating layer comprising second through holes located in the pixel regions and sixth through holes located in the non-display region, the second through holes and the first through holes being arranged in a communication manner, and the third through holes communicates with the fourth through holes via the sixth through holes.

* * * * *